United States Patent
Marocco

(10) Patent No.: US 7,114,421 B2
(45) Date of Patent: Oct. 3, 2006

(54) FABRIC BLIND CUT DOWN APPARATUS AND METHOD OF TRIMMING FABRIC BLINDS

(75) Inventor: Norbert Marocco, Woodbridge (CA)

(73) Assignee: Shade-O-Matic Limited, Toronto (CA)

( * ) Notice: Subject to any disclaimer, the term of this patent is extended or adjusted under 35 U.S.C. 154(b) by 39 days.

(21) Appl. No.: 10/215,077

(22) Filed: Aug. 8, 2002

(65) Prior Publication Data

US 2004/0025652 A1    Feb. 12, 2004

(51) Int. Cl.
- B26D 1/00    (2006.01)
- B26D 7/06    (2006.01)
- B26D 5/08    (2006.01)

(52) U.S. Cl. ............................... 83/13; 29/24.5; 83/35; 83/39; 83/52; 83/197; 83/588; 83/628

(58) Field of Classification Search ................. 29/24.5; 83/13, 39, 52, 197, 588, 628, 35
See application file for complete search history.

(56) References Cited

U.S. PATENT DOCUMENTS

| | | | |
|---|---|---|---|
| 2,494,759 A | 1/1950 | Hirschy | |
| 4,443,915 A | 4/1984 | Niemeyer | |
| 4,603,725 A * | 8/1986 | Knight | 160/243 |
| 4,719,956 A | 1/1988 | Valle | |
| 4,955,420 A | 9/1990 | Marinescu et al. | |
| 5,103,702 A * | 4/1992 | Yannazzone | 83/29 |
| 5,156,196 A | 10/1992 | Corey et al. | |
| 5,816,126 A * | 10/1998 | Pluber | 83/167 |
| 6,167,789 B1 * | 1/2001 | Daniels et al. | 83/13 |

* cited by examiner

Primary Examiner—Kenneth E. Peterson
Assistant Examiner—Isaac N. Hamilton
(74) Attorney, Agent, or Firm—Ohlandt, Greeley, Ruggiero & Perle, L.L.P.

(57) ABSTRACT

A method of trimming the width of a blind having a head rail and a fabric panel depending therefrom, by a predetermined trim measurement, by trimming a first length from the head rail, retracting the head rail away from a first side edge of said fabric panel, trimming a second length from the first edge of the fabric panel,; moving the head rail axially relative to the fabric panel so as to retract it from a second side edge of the fabric panel opposite to the first side edge, trimming a third length from the second edge of the fabric panel, and moving the head rail axially relative to the fabric panel whereby to locate it equidistant from the first and the second edges of the fabric panel. Also disclosed is apparatus for trimming such a fabric blind.

15 Claims, 8 Drawing Sheets

FABRIC BLIND CUT DOWN APPARATUS AND METHOD OF TRIMMING FABRIC BLINDS

FIELD OF THE INVENTION

The invention relates to an apparatus for trimming the width of fabric blinds, by cutting down the width of the head rail and blind fabric, and the bottom rail if provided, and to a method of trimming fabric blinds.

BACKGROUND OF THE INVENTION

Blinds having a head rail and a panel of blind fabric suspended from the head rail are well known. Such blinds have a fabric panel which hangs vertically down from a head rail. Mechanism is provided in the head rail for raising and lowering the fabric panel. In many cases the panel is formed into horizontal folds or pleats, although this is not essential. Cords extend down from the head rail at spaced intervals and attach to the lower edge of the panel. Usually the cords run through holes in the fabric, or rings or loops or guides of some kind attached to the rear of the panel, although other arrangements are possible. In many cases the lower edge of the fabric panel contains or supports a rigid rail similar to the bottom rail in conventional venetian blinds. The head rails, and in many cases the bottom rails, are made of metal.

In the past blinds such as this type were usually sold by a salesperson visiting the home. The person would take measurements and write up an order. The blinds were then custom made in a factory, and delivered to the home and installed there.

Currently, in the marketing of such blinds, it is becoming the custom to market these blinds through department stores. Blinds are supplied to the store in standard widths. A customer will measure the actual window or door opening in which he wishes to erect a blind. He will then select a blind of a suitable design, for his taste and his specific window or door. He will then place his order for that blind, in the store. The sales clerk will then locate from amongst the inventory of standard width blinds in the store, a blind of the required design having a width greater than that required by the customer.

The sales clerk will then trim the blind so as to fit the customer's requirement. The cords are located equidistant from each side of the fabric panel. When trimming the width of the blind, each trim cut should be made at an equal spacing from each side edge of the blind. In this way the final trimmed blind has a symmetrical appearance, with the cords being an equal distance from each side edge of the blind, although that distance is less than in the blind before trimming. Trim cutting of the head rail and bottom rail does not require cutting at each end of each rail. This is because the head rail and bottom rail are axially slidable relative to the top and bottom of the fabric panel. Consequently, once the head rail and bottom rail are slid axially relative to the fabric panel, each rail can be cut to length by trimming only one end, of each rail.

Trimming or cutting the metal components, such as the head rail, and the bottom rail if provided, requires a considerable force. However the cutting device, preferably a cutting die, will move only a short distance to make the cut. Usually this distance is no more than the thickness of the metal itself. Various machines are available for trimming blinds. Some use cutting blades. Others use actual profiled cutting dies, especially for cutting metallic head rails.

Examples of such in store point of sale blind trimming machines can be seen in U.S. Pat. Nos. 5,806,394, 6,196,099, 6,178,857, 6,089,134, all of which are owned by Shade-O-Matic Limited, also the owner of the present application.

As explained above, fabric panel blinds are typically formed with pleats or fold lines extending horizontally.

In a preferred form of fabric blind, as explained, the head rail is movable or slidable axially relative to the fabric panel. Similarly the bottom rail will be either movable or slidable relative to the panel, or will be contained within a pocket formed in the lower edge of the panel.

For purposes of trimming, the fabric panel will be folded into pleats in a series of tight folds. Cutting of the panel is achieved by means of a knife blade which slices through the folds of fabric cleanly in a single stroke. These cuts, at each side edge of the panel are made while the head rail and bottom rail are slid axially, to one side. In this way the cutter knife blade can slice through the fabric without also cutting the rails.

The folded fabric is much thicker than the metal forming the head rail and the bottom rail. Consequently the cutting stroke required to cut the folds of the fabric panel is much longer than the cutting stroke required to cut thin metal head rails or bottom rails. However cutting the fabric requires less manual effort than cutting the metal components. Thus either the manual effort required to cut the metal components must increase, as compared with the effort to cut the fabric panel, or the leverage available in the cutting machine, for cutting the metal, must be increased, as compared with the leverage required for cutting the fabric. For this purpose the cutting stroke of the head rail (and bottom rail) cutting die is powered through one transmission system, and the longer cutting stroke for the fabric cutting blade is powered through another transmission system. Both transmissions connect to a single common operating lever, and both are operated by a single manual stroke of the operating lever.

BRIEF SUMMARY OF THE INVENTION

In order to achieve these objectives the invention seeks to provide a method of trimming the width of a blind having a head rail and a fabric panel depending therefrom, said trimming being of a predetermined length, and wherein the head rail is axially moveable relative to the fabric panel, and comprising the steps of; trimming a first length from said head rail; retracting said head rail away from a first side edge of said fabric panel; trimming a second length from said first edge of said fabric panel; moving said head rail axially relative to said fabric panel whereby to retract it from a second side edge of said fabric panel opposite to said first side edge; trimming a third length from said second edge of said fabric panel and moving said head rail axially relative to said fabric panel whereby to locate it equidistant from said first and said second edges of said fabric panel. The invention further seeks to provide a method having the foregoing advantages and wherein, said second length is equal to about one half of said first length; and wherein said third length is equal to about one half of said first length.

The invention further seeks to provide a method having the foregoing advantages and wherein said blind further incorporates a bottom rail moveable relative to said fabric panel, and including the steps of trimming said bottom rail by a fourth length, said fourth length being equal to said first length.

The invention further seeks to provide a method having the foregoing advantages wherein said blind after trimming has a trimmed width which is uniform along each said side edge.

The invention further seeks to provide a method having the foregoing advantages including the steps of retracting said head rail from a first side edge of said fabric panel whereby to extend a portion of said head rail from a second side edge of said fabric panel, and retracting said bottom rail from said first side edge of said fabric panel whereby to extend a portion of said bottom rail from said second side edge, and trimming said first length from said extended portion of said head rail and further trimming said fourth length from said extended portion of said bottom rail.

The invention further seeks to provide a method having the foregoing advantages wherein said trimming of said head rail and said bottom rail take place simultaneously.

The invention further seeks to provide a method having the foregoing advantages Including the steps of placing said extended portion of said head rail through an head rail support opening, and further inserting said portion of said head rail through an head rail cutting die, and moving said die relative to said support opening whereby to trim said head rail.

The invention further seeks to provide a method having the foregoing advantages and Including the steps of placing said extended portion of said bottom rail through a bottom rail support opening, and further inserting said portion of said bottom rail through a bottom rail cutting die, and moving said die relative to said bottom rail support opening whereby to trim said bottom rail.

The invention further seeks to provide a method having the foregoing advantages and further including the step of inserting said first side edge of said fabric panel through an fabric panel support opening and passing said fabric panel in registration with cutting means, and operating said cutting mens to trim said first edge of said fabric panel, and thereafter moving said head rail and said bottom rail in the opposite direction clear of the second edge of the fabric panel and repeating said steps in respect of said second edge of said fabric panel The invention further seeks to provide apparatus for trimming the width of a blind having a head rail and a fabric panel depending therefrom, and a bottom rail along a lower portion of said fabric panel, by trimming a predetermined first length from the head rail, and by trimming second and third lengths from opposite side edges of said fabric panel and by trimming a fourth length from said bottom rail, and wherein the head rail and bottom rail are axially moveable relative to the fabric panel, and comprising; a head rail support for supporting the head rail during trimming; a bottom rail support for supporting the bottom rail during trimming, said head rail support and said bottom rail support being located side by side adjacent to one another; a cutter plate moveable along a rail cutting path and carrying a head rail cutting die and a bottom rail cutting die, adjacent one another for trimming said first length from one end of said head rail and said fourth length from a corresponding end of said bottom rail; a fabric panel support for supporting said fabric panel during trimming; a fabric panel cutter moveable along a panel cutting path for trimming said second length from said first side edge of said fabric panel, and being subsequently operable for trimming said third length from said second side edge of said fabric panel, in sequence, wherein said panel cutting path is longer than said rail cutting path; operating means for moving said cutting plate along said rail cutting path thereby moving said head rail cutting die and said bottom rail cutting die simultaneously to cut both said head rail and said bottom rail; and, transmission means connecting said operating means to said fabric panel cutter, for moving said fabric panel cutter along said panel path, thereby cutting said fabric panel. The invention further seeks to provide apparatus for trimming the width of a blind and wherein said head rail support opening defines the shape of a generally three-sided channel having an open side, with said open side facing in a predetermined direction and wherein said bottom rail support opening defines the shape of a generally three-sided channel having an open side, with said open side facing in towards said head rail support opening.

The invention further seeks to provide apparatus for trimming the width of a blind and including a fabric buffer member mounted along one side of said fabric opening, and a fabric compression member movably mounted on the opposite side of said fabric opening, and connection means connecting said compression member with said transmission and operable to move said compression member towards said buffer member upon operation of said lever.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Figure 9:
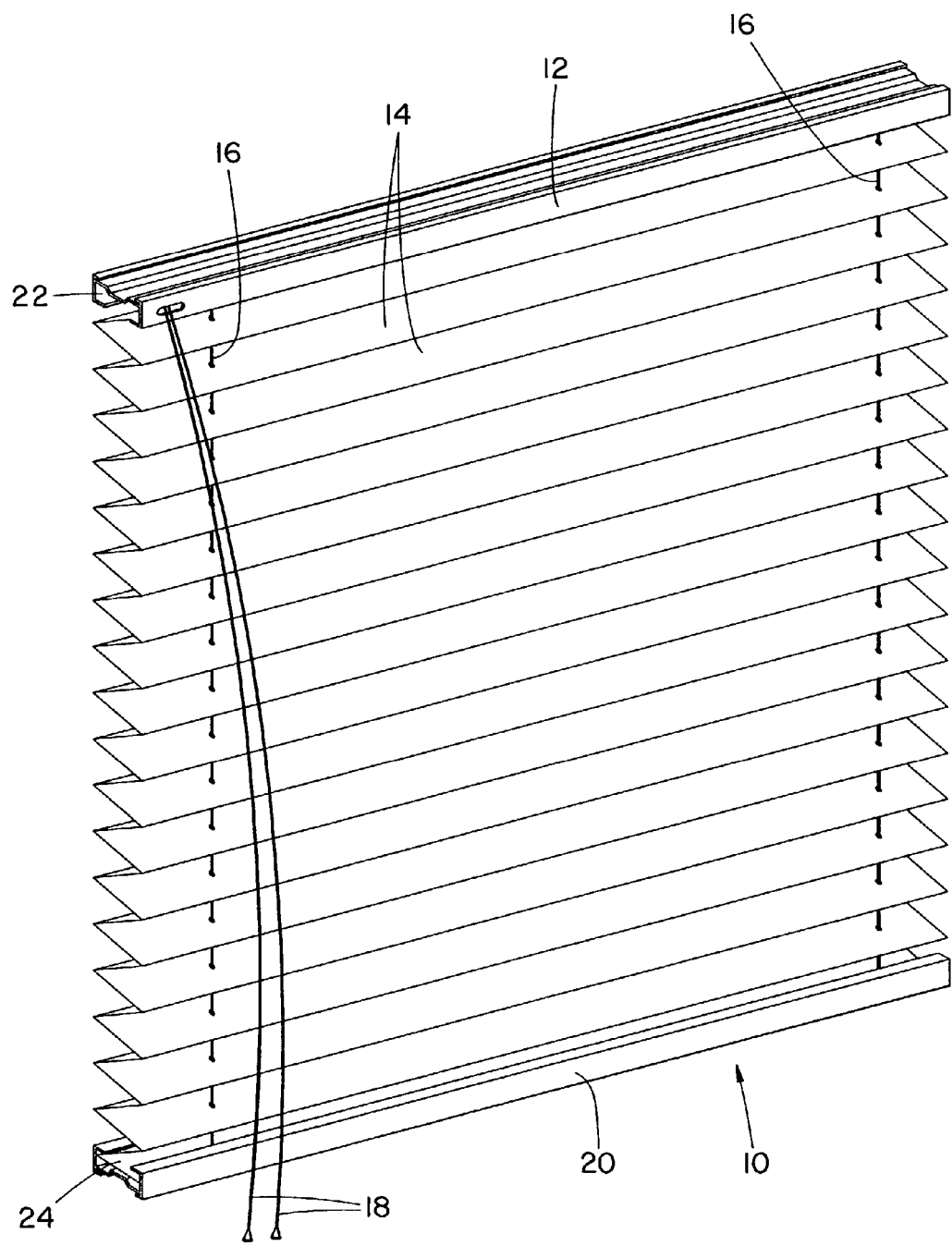
FIG. 9 is a general perspective of a preferred form of fabric panel blind, for the purposes of illustrating the invention.
Figure 10:
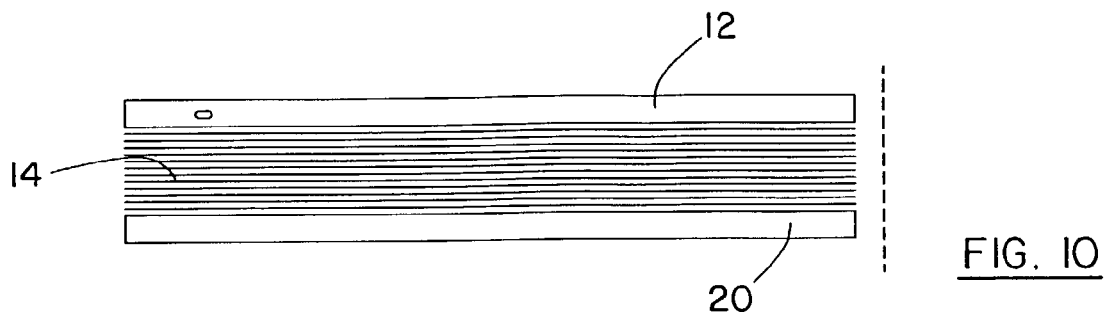
FIG. 10 is a schematic front elevation of FIG. 7 showing the head and bottom rails, and fabric panel, showing a trim cut in phantom.
Figure 11:
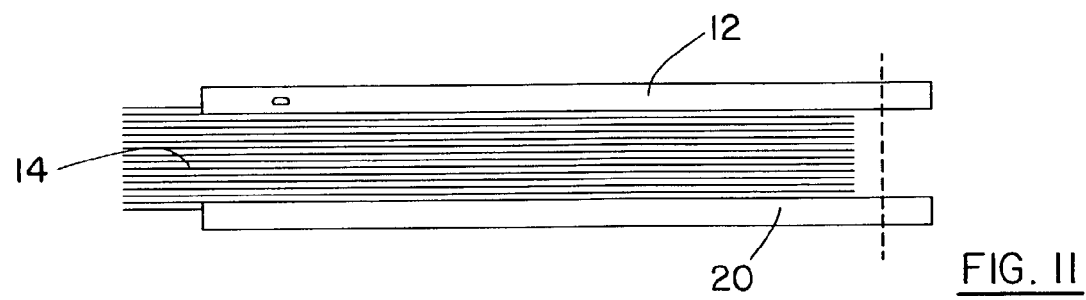
FIG. 11 is a schematic front elevation showing the head rail and bottom rails extended away from the panel, and showing the location of a first trim cut, on one end of the head rail and bottom rail.
Figure 12:
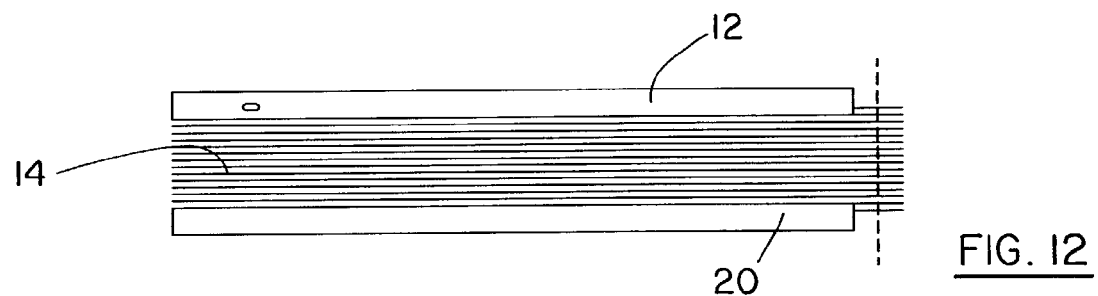
FIG. 12 is a schematic front elevation showing the location of a second trim cut, on the first side edge of the fabric panel.
Figure 13:
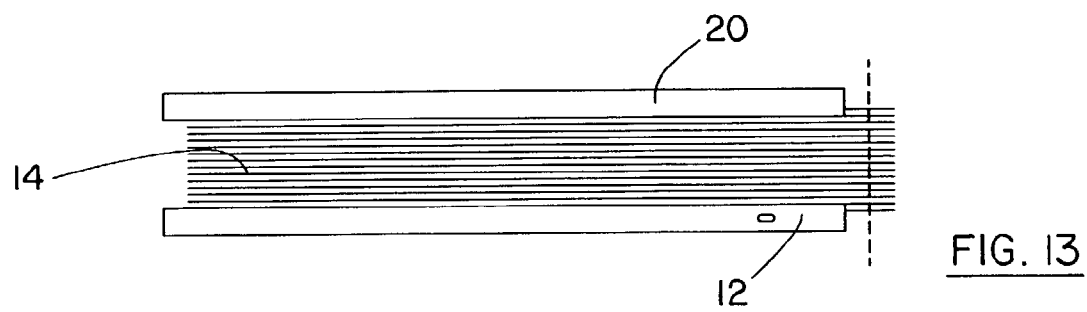
FIG. 13 is a schematic front elevation showing the location of a third trim cut on the second side edge of the fabric panel; and, FIG. 14 is a schematic front elevation showing the blind after trim cutting.
Figure 14:
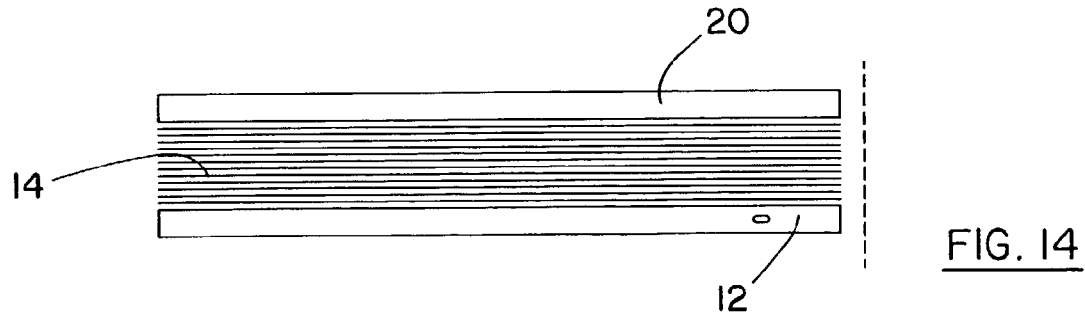

As mentioned above the invention relates to blinds in which the head rail supports a fabric blind panel, and in which the head rail is made of metal. Such a fabric panel blind may, or may not, also include a bottom rail FIG. 9 illustrates a preferred form of fabric panel blind (10) for the practice of the invention. It has a head rail (12), and a fabric blind panel (14). Tapes or cords (16) extend down from the head rail, equidistant from the two edges of the fabric panel, by which the fabric blind panel (14) can be raised or lowered. Usually these cords will extend through holes in the fabric, although in some cases they may extend down the rear side of the fabric panel. In this case loops or rings are provided (not shown), being attached to the rear side of the fabric panel(14), through which the cords run. Such fabric panel blinds are usually formed in a series of horizontal pleats or folds as shown, so that, when raised the panel will fold into a neat compact space under the head rail. A blind control (18) connects, usually, with known cord winding devices (not shown), mounted in the head rail(12), and hangs downwardly. Such a fabric panel blind(10) will usually also have a bottom rail (20), typically although not exclusively made of metal. The cords or tapes (16) are usually connected to the winding devices. However in some cases, the control (18) is simply connected to the cords (16) themselves, within the head rail.

Such controls are well known in the art and require no description. The head rail (12) in this embodiment of blind is in the form of a three sided U-shaped channel, with the open side (not shown) facing downwardly.

The bottom rail (20) in this embodiment of blind is of the same cross-section profile and the head rail (12). Bottom rail (20) comprises a three-sided channel with an open side (not shown ) facing upwardly. In this type of blind the fabric panel (14) is received in the head rail channel, and in the bottom rail channel, and the head rail and the bottom rail are axially moveable or slidable relative to the fabric panel (14). This enables the head rail and the bottom rail to be extended to one side edge or the other of the fabric panel (14).

As has been explained these blinds are supplied to retail stores in standard lengths.

A customer can visit the store select a blind of a suitable design and pattern, which is wider than his requirements. He then asks the sales clerk to trim the width of the blind to his own measurements. The sales clerk will then take the selected blind to the cut down machine, and trim the head rail, (and bottom rail), and the sides of the blind fabric panel, to the width specified by a customer. The sales clerk will use a cut down apparatus as described herein by the blind supplier for this purpose.

The customer then simply takes the blind home and installs it himself. The whole procedure can take place on a single shopping trip by the customer, thus increasing sales, and greatly reducing the time required to place blinds in the desired locations, in the home. In addition, because the manufacturer supplies blinds in quantity, and in standard lengths, to the store, the volume of each sale and shipment is increased, and the size of each order is increased. This enables the manufacturer to reduce the price of its blinds substantially.

Figure 1:
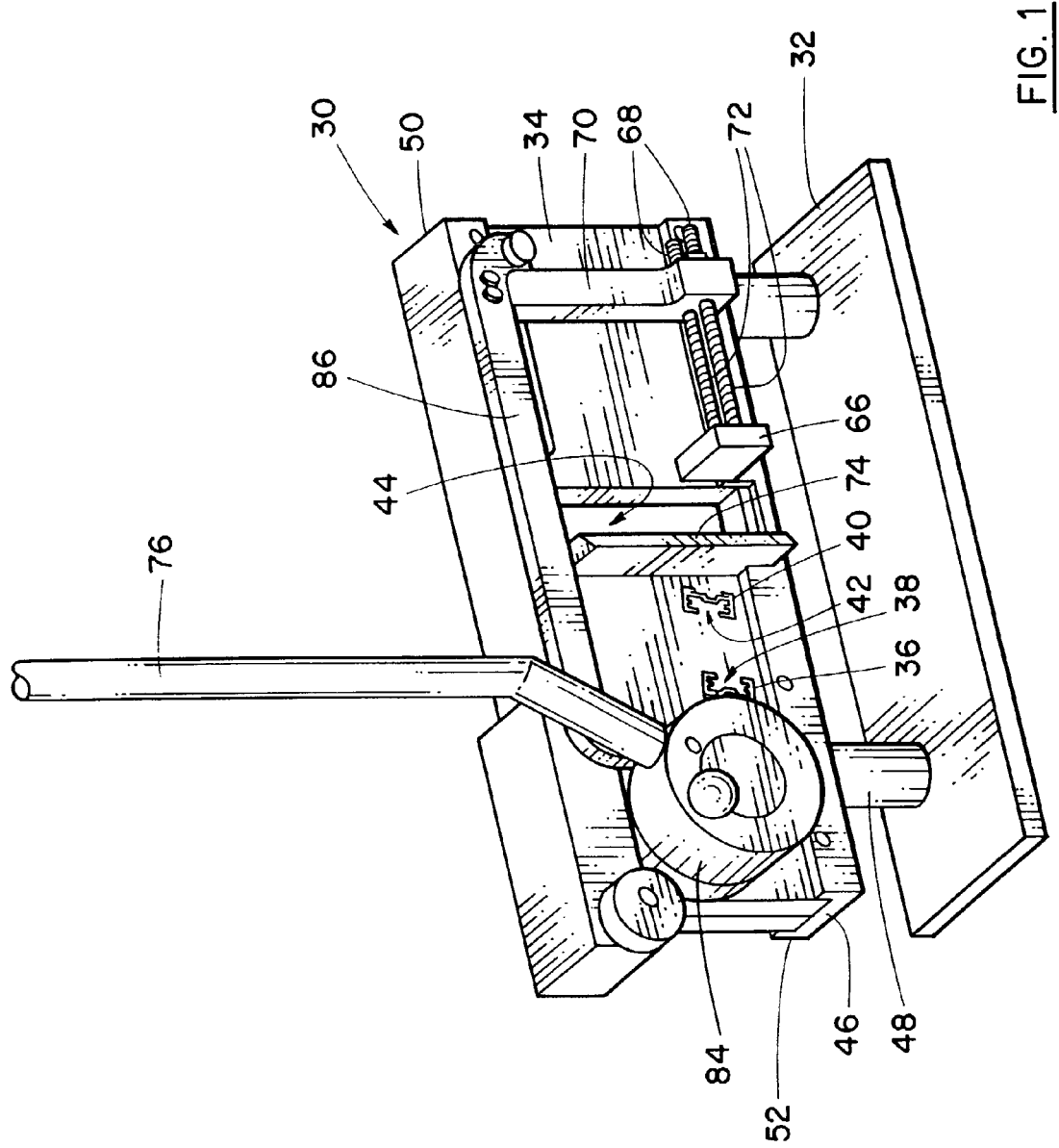
FIG. 1 is a general perspective of a blind trimming apparatus for trimming fabric blinds, and illustrating the invention.
Figure 2:
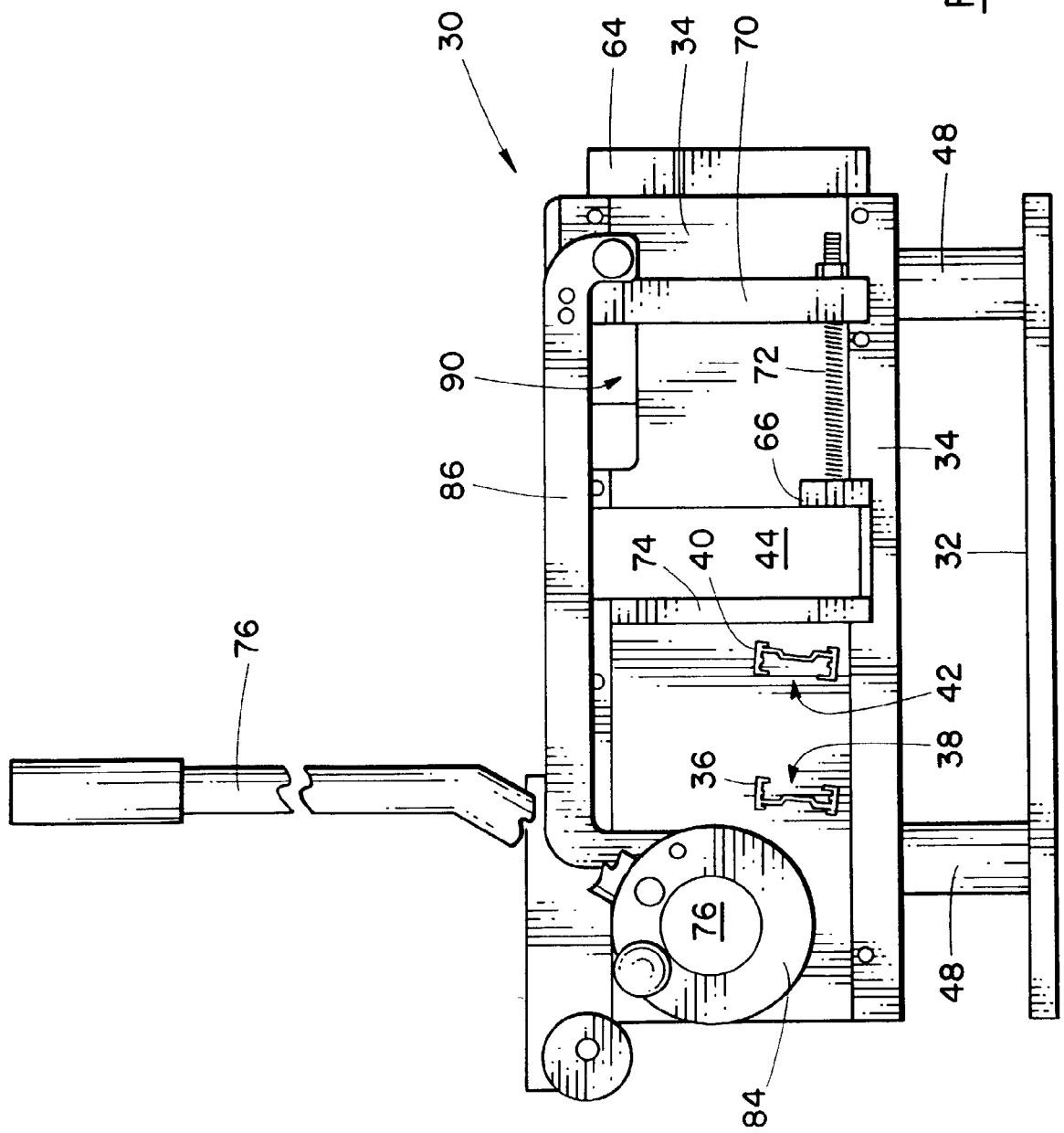
FIG. 2 is a side elevation, from one side, of FIG. 1.
Figure 3:
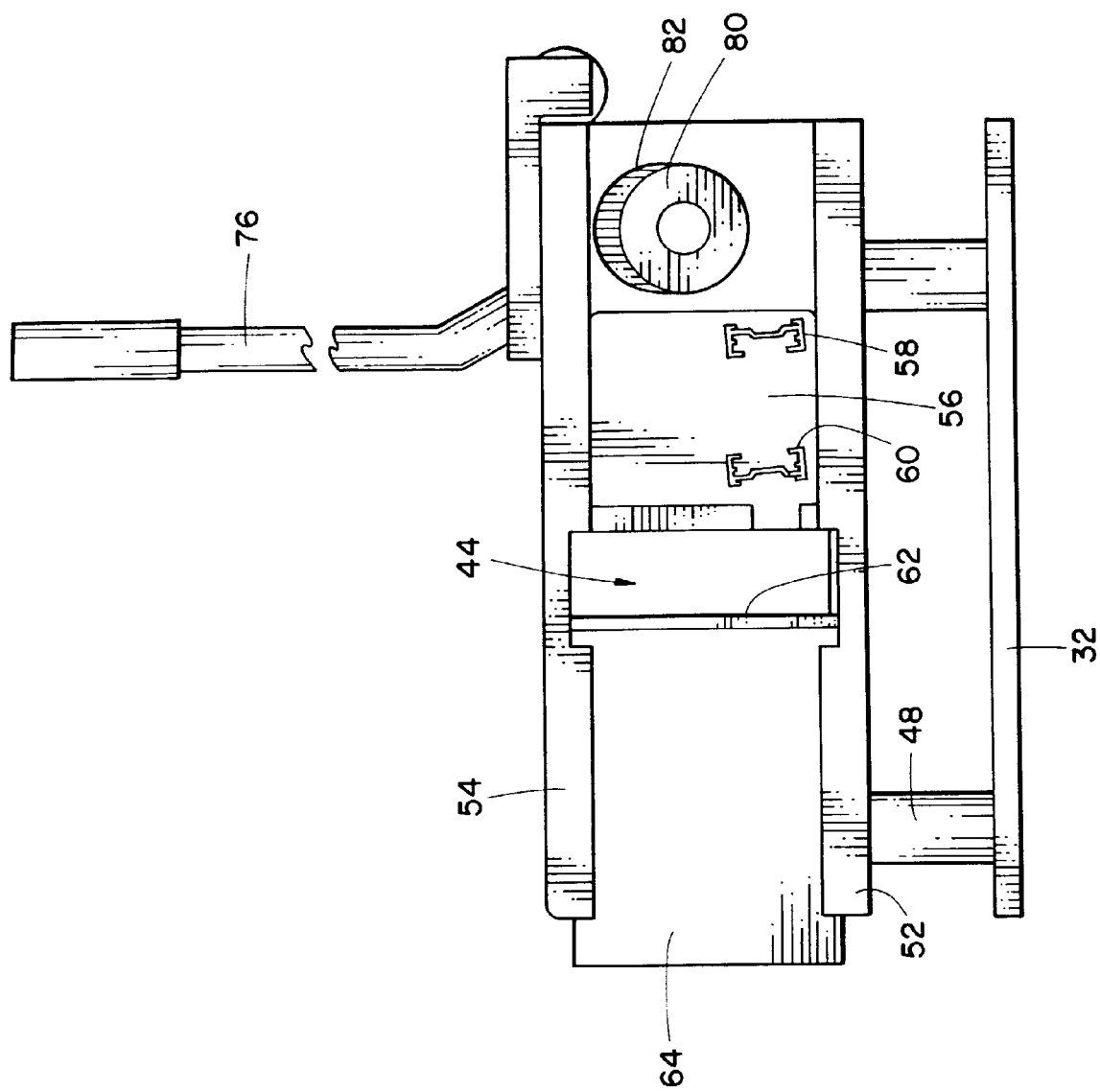
FIG. 3 is a side elevation, from the opposite side, of FIG. 1.
Figure 5:
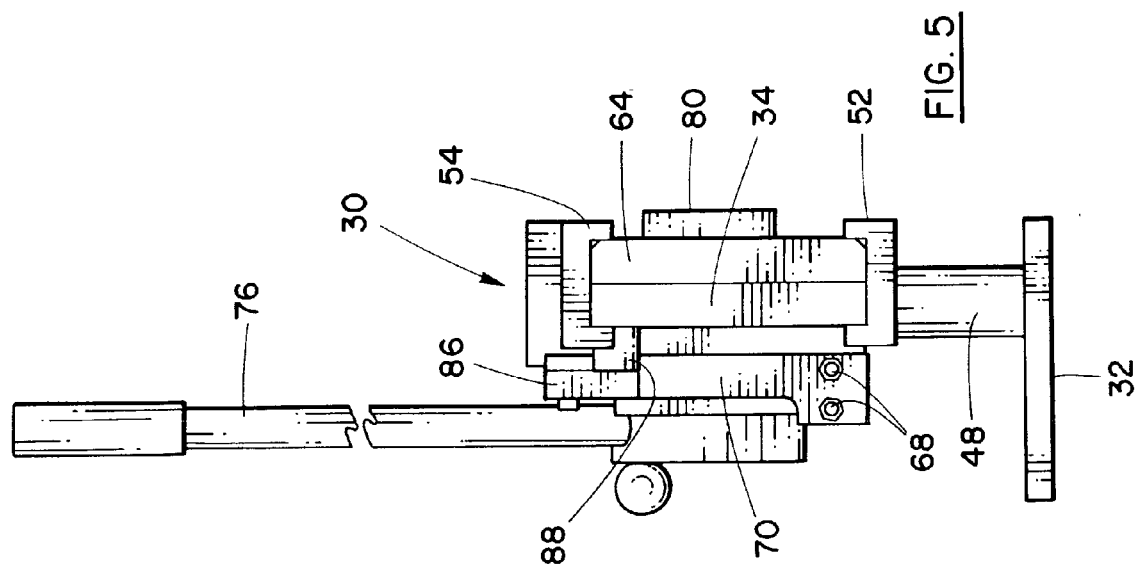
FIG. 5 is an end view from the opposite end of FIG. 1.
Figure 4:
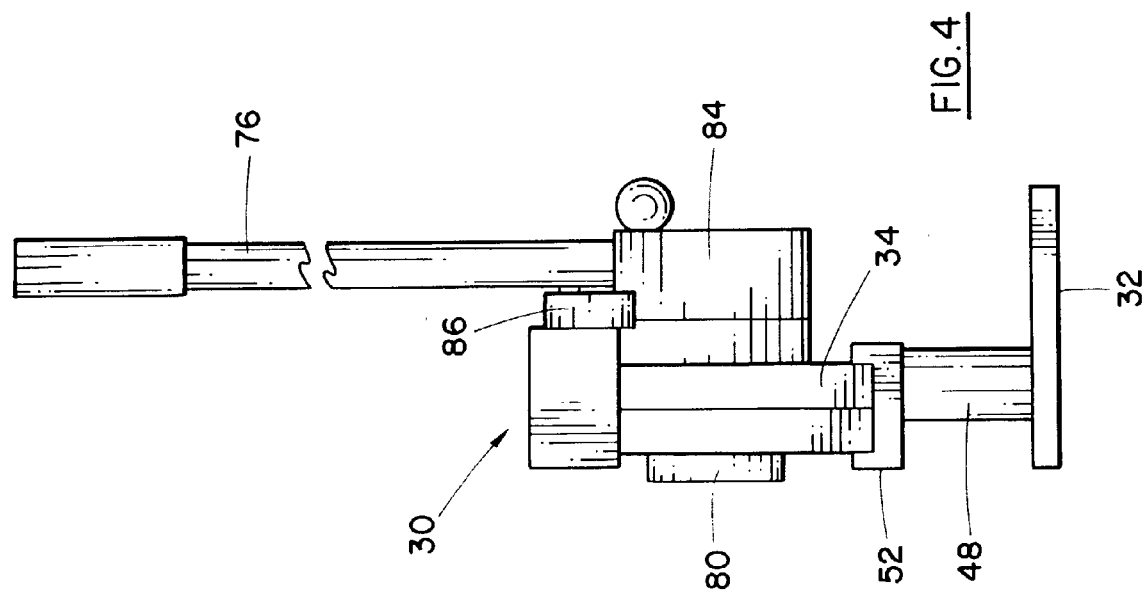
FIG. 4 is an end view from one end of FIG. 1.

One embodiment of the invention is illustrated in FIGS. 2, and 3. As shown in FIGS. 1 to 7 the trimming apparatus is shown generally as (30). It has a base (32) which is, in this case a flat metal plate. It can be mounted on a bench or counter top in a suitable workplace location in a store.

A blind support plate (34) is attached on base (32) and lies in a generally vertical plane extending upwardly therefrom. Support plate (34) has a head rail support opening (36) shaped to the profile of the head rail of the blind, extending transversely through support plate (34). Thus the head rail support opening is in the shape of a three-sided channel, having an open side (38) facing to the right in FIGS. 1 and 2.

A bottom rail support opening (40) extends through support plate (34), adjacent to and spaced from the head rail support opening (36). In this case it has a shape corresponding to the shape of the bottom rail (20), in the form of a three-sided channel having an open side (42), which in this case faces to the left in FIGS. 1 and 2.

Thus the open sides of the openings (36) and (40) face one another, and the two openings are located a convenient distance apart for reasons which will become apparent below.

Note that reference to left and right, are purely for the purpose of explanation of the illustration, and are without limitation.

The bottom rail support opening (40), is shaped to the profile of the bottom rail, and located along an axis which lies generally horizontal, in this embodiment. The head rail and bottom rail in this embodiment are of similar cross section, and define generally three-sided channels.

The head rail support opening (36) and bottom rail support opening (40), in this embodiment face one another, so that the open sides of their respective channels are directed towards one another.

A fabric panel opening (44) also extends through support plate (34). Fabric panel opening (44) is a generally rectangular opening which is of sufficient dimension to receive the folds or pleats of the fabric panel.

On the lower edge of support plate (34) there is a lower guide bar (46), secured by screws, bolts or the like and lying on the base plate (32). Alternatively columns (48) can be mounted on base plate (32) and lower guide bar (46) can be mounted on their upper ends. On the upper edge of support plate (34) there is an upper guide bar(50) secured by screws, bolts or the like. Lower and upper guide bars (46) and (50) define lower and upper guide channels(52) and (54) facing one another and aligned with one another.

In order to cut the head rail and bottom rail, a rail shear plate member (56) is slidably received in guide channels (52) and (54). Shear plate member (56) is formed with, or has mounted thereon, a head rail cutting die (58) located in registration with head rail support opening (36) in support plate (34). A bottom rail cutting die (60) is formed in or mounted on shear plate member (56) spaced from the head rail cutting die (58), and registers with bottom rail support opening (40) in support plate (34).

Head rail die (58) and bottom rail die (60) define open sided channel shapes corresponding to the head rail opening (36) and the bottom rail support opening (40), with their open sides facing one another. The rail shear plate member (56) is moveable along a rail shearing path of sufficient length to sever the thickness of the metal forming the head rail and bottom, rail.

In order to cut the fabric panel, a fabric cutter blade (62) is provided, mounted in this case on a cutter plate or frame (64). Frame (64) is slidably supported in lower and upper guide channels (52) and (54). Frame (64) carrying blade (62), is moveable in registration with fabric opening (44) in support plate (34). Blade (62) is moveable along a movement path, or panel cutting path sufficient to traverse opening (44) thereby ensuring a complete cut of the fabric extending there through.

Thus the shearing path of the rail shear plate (56) is relatively short, whereas the cutting path of fabric cutting blade (62) is considerably longer.

In order to hold the fabric in fabric support opening (44) while it is being cut, a clamp (66) is provided. Clamp (66) is mounted on two rods (68) which are slidably held on bar (70). Springs (72) are provided around rods (68) and normally urge the clamp (66) into its extended position. During the fabric cutting stroke, the clamp (66) engages the fabric in fabric support opening (44) and squeezes it against a stop (74), thus holding it securely for accurate cutting.

Movement of both the rail cutting plate (56) and the cutter frame (64) is achieved, in this embodiment, through a single manually operated lever (76). Other forms of movement means could be provided, including a screw drive system, or power cylinders, such as hydraulic cylinders, none of which are illustrated and are believed to be within the competence of those skilled in the art.

Lever (76) is rotatably mounted on a drive shaft (78) extending through support plate (34). An eccentric cam roller (80) is mounted on shaft (76) and is received in a drive recess (82) in rail shear plate (56). Semi-rotary movement of lever (76) will cause rotation of drive shaft (78) will thus cause rotary movement of cam roller (80). Roller (80) engages the edges of the rail shear plate within recess (82), and will thus cause rail shear plate (56) to move along its rail shearing path.

Movement of cutter frame (64) carrying fabric cutter blade (62) is achieved by an eccentric boss (84) mounted on shaft (78), and a connecting link (86) extending from the periphery of boss (84) to frame plate (64).

Movement of cutter frame (64) will also commence as the lever (76) makes a semi-rotary power stroke and will completely traverse the fabric support opening (44) in a single stroke, in this embodiment. It will also cause movement of clamp (66) so as to squeeze and hold the fabric against the stop (74) within support opening (44) during cutting of the fabric.

Figure 8:
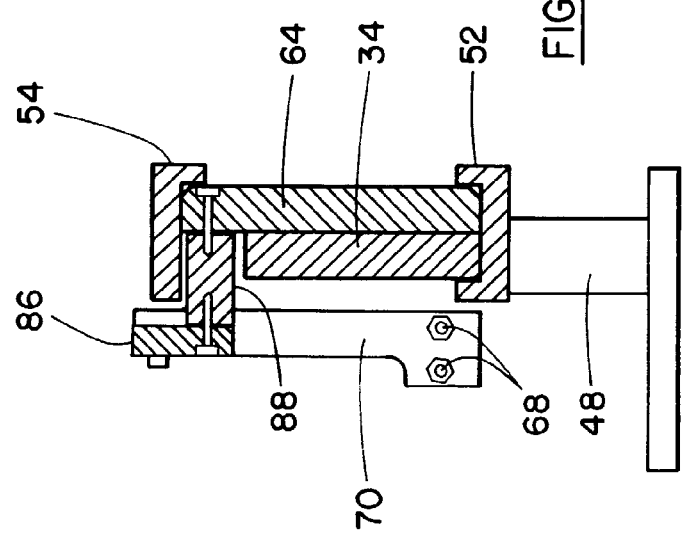
FIG. 8 is a section along line 8—8 of FIG. 7.
Figure 6:
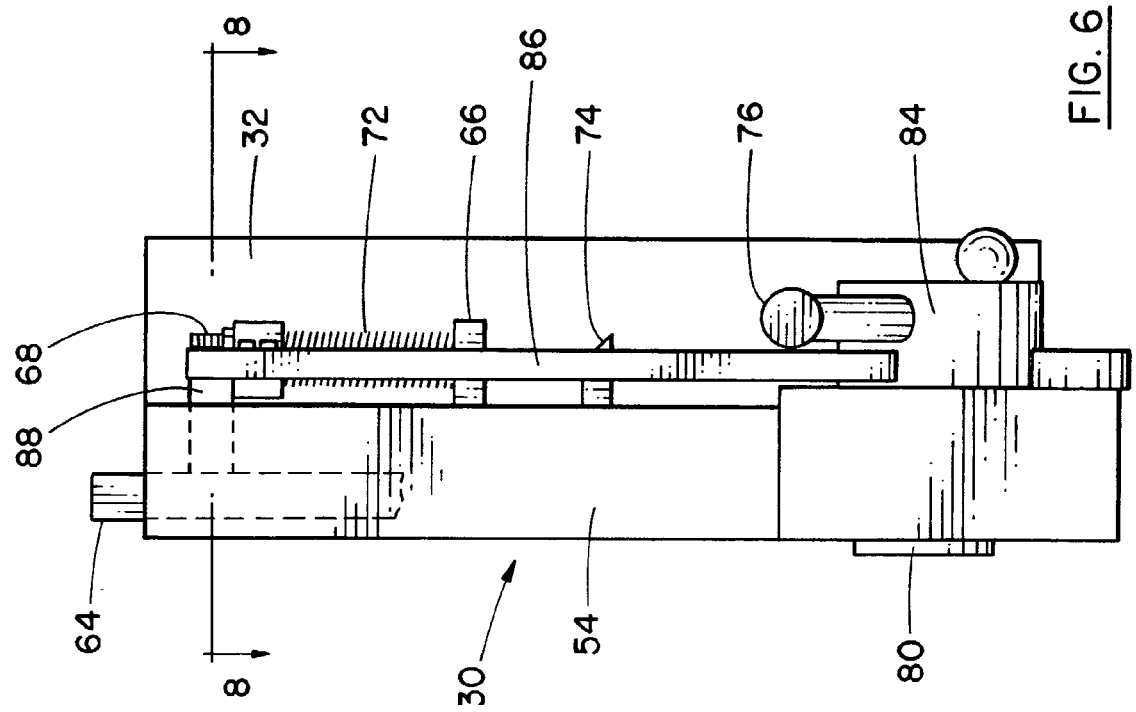
FIG. 6 is a top plan view of FIG. 1.
Figure 7:
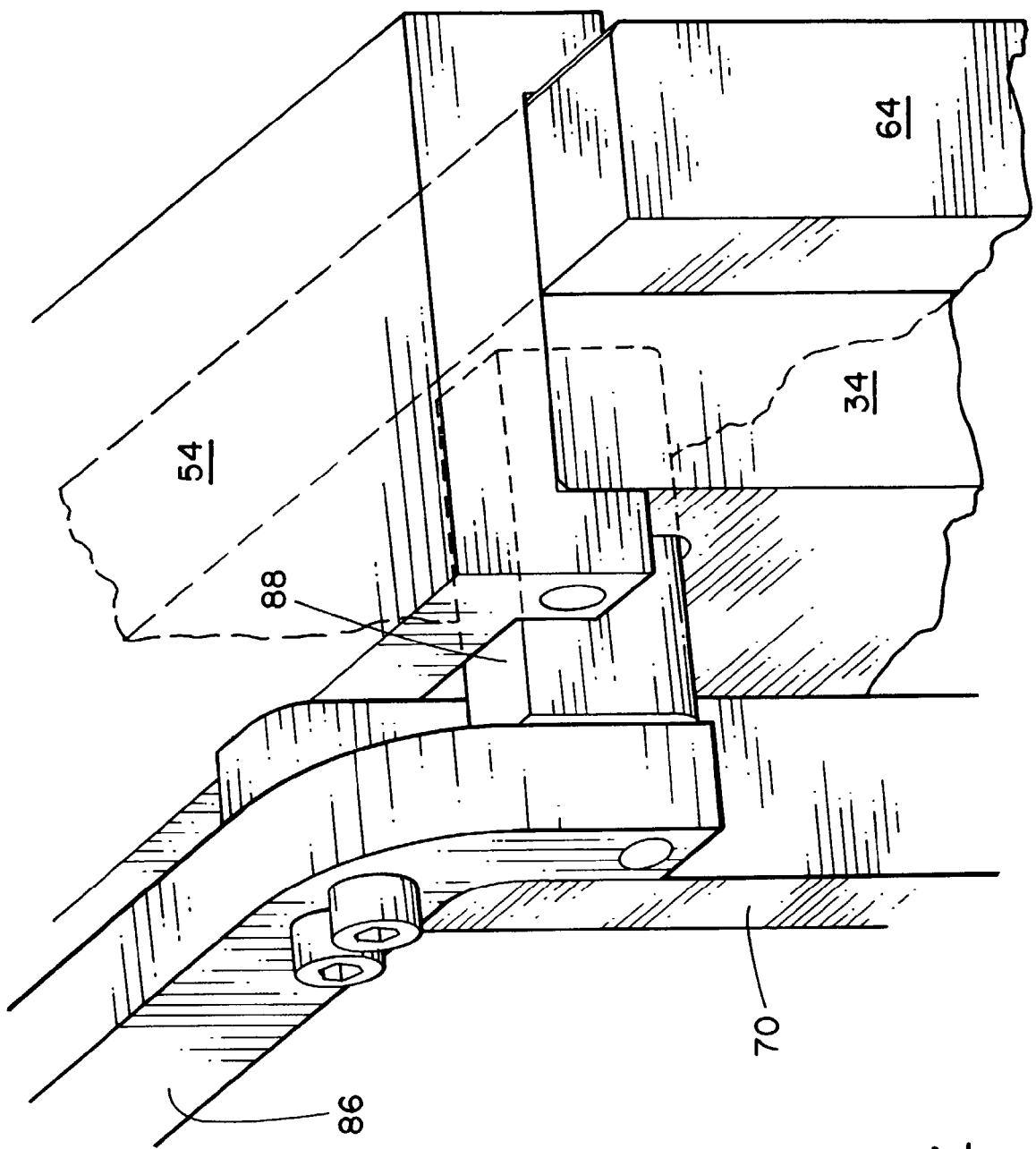
FIG. 7 is a perspective view of the transmission for the cutting blade.

Link (86) is connected to plate (64) by a transverse transmission block (88). Block (88) is located within a transmission opening (90) in support plate (34) FIG. 7 and 8, and is bolted to bar (72) beneath link (86) on the one side of support plate (34) and is bolted to the frame plate (64) on the other side of support plate (34). Opening (90) is oversize relative to block (88) and is thus large enough to permit movement of block (88) along the full length of the cutting stroke of frame plate (64).

In operation assuming it is intended to trim a fabric blind having both a head rail (12) and a bottom rail (20), and a single panel of pleated fabric (14) the operator begins by moving or sliding the head rail (12), and the bottom rail (20) so that one end of each extends part way to one side of the fabric panel (14), and thus extend away from one side edge of the fabric panel (14) The ends of the head rail and bottom rail selected for trimming will be the ends which are remote from the cord controls (18). The two rails are readily movable or slidable partially endwise relative to the fabric panel (14) and this presents no difficulty. The ends of the head rail and bottom rail are then inserted into their respective support openings (36) and (40) in support plate (34).

The head rail and bottom rail have their open sides facing each other. This is matched by the orientation of their respective support openings (36) and (40), and thus ensures convenient operation for cutting both rails simultaneously.

They will be extended through die openings (58) and (60). The length of the amount of each rail to be trimmed will correspond to the total trim required for that blind. At this stage the fabric panel (14) is not inserted into its support opening (44).

The lever (74) is then operated so as to move rail shear plate (56). The shear plate (56) moves through a short shearing path equivalent to the thickness of the metal. This will require considerable force. Consequently the apparatus provides a great degree of leverage in the transmission from the lever (76) to the shear plate (56), to enable this to be done manually. This will sever both the head rail (12) and the bottom rail (20). The two rails are then withdrawn from their openings (36) and (40). With the two rails still partially extended from the one edge of the fabric panel (14) the opposite edge of the fabric panel (14) will then be bunched into its pleats and inserted into the fabric opening (44) in support plate (34). The edge of the fabric panel (14) will be extended beyond blade (62) by a distance equal to one half the trim cut required. It will be understood that when in this position that side edge of the fabric panel does not contain either the head rail or the bottom rail. These two rails have already been trimmed by an amount equal to the total desired trim cut, and in this position their ends are located inwardly of the side edge of the fabric panel being trimmed.

Lever (74) is then operated moving blade (62) and thus cutting the first edge of the fabric panel (14). The movement path of the blade (62) for cutting the fabric is considerable longer than that required for moving the rail shear plate for shearing the head rail and bottom rail, but the force required is much less. The transmission provides therefor a lesser degree of leverage, but a greater length of movement of the cutting blade (62). The same lever movement will also have moved clamp (66) so as to squeeze and hold the fabric panel (14) securely against stop (74) within opening (44) during cutting.

The fabric panel (14) is then withdrawn from opening (44). The head rail (12) and bottom rail (20) are then moved, or in this case slid, relative to the fabric panel (14) so that they extend from the first side edge of the fabric panel which has now been trimmed. The second side edge of the fabric panel (14) is then inserted into fabric panel support opening (44) and extended beyond blade (62) by an amount corresponding to the rest of the total trim cut. Lever (76) is again operated, thus moving blade (62). This will then trim the second edge of the fabric panel (14).

Then head rail (12) and bottom rail (20), at this point, have a length equal to the reduced width of the fabric panel. The rails can then be moved axially back relative to the fabric panel (14) and the blind is then ready for delivery to the customer.

By cutting in three steps, the head rail and the bottom rail are cut, at one end, remote from the controls (18), by an amount or length equal to the total length of the trim cut. The fabric panel (14) is cut, down each side edge, by amounts equal to one half of the trim cut, on each side edge. The end result is a fabric blind in which the head rail and bottom rail and the fabric panel are all trimmed to the desired width, but in which the fabric panel remains symmetrical relative to the cords (16), down both side edges.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A method of trimming the width of a blind having a head rail and a fabric panel, the fabric panel depending therefrom, wherein the head rail is axially moveable in a direction relative to the fabric panel, the method comprising the steps of:

trimming a first length from the head rail;
retracting the head rail away from a first side edge of the fabric panel;
trimming a second length from said first side edge of the fabric panel;
moving the head rail axially relative to the fabric panel, the head rail retracting from a second side edge of the fabric panel opposite said first side edge;
trimming a third length from said second side edge of the fabric panel; and
moving the head rail axially relative to the fabric panel, wherein the head rail is located equidistant from said first side edge and said second side edge of the fabric panel, wherein said second length is equal to about one half of said first length, and wherein said third length is equal to about one half of said first length.

2. The method of claim 1, wherein the blind has a bottom rail moveable in the axially moveable direction relative to the fabric panel, the method having the step of trimming said bottom rail by a fourth length, said fourth length being about equal to said first length.

3. The method of claim 1, wherein the blind after trimming has a trimmed width, said trimmed width being substantially uniform along each of said first side edge and said second side edge, thereby locating a blind control about equidistant from both said first side edge and said second side edge.

4. The method of claim 2, wherein the method further comprises the step of retracting the head rail from said first side edge of the fabric panel to extend a portion of the head rail from said second side edge of the fabric panel, and retracting the bottom rail from said first side edge of said fabric panel, wherein said bottom rail has a portion that is extended from said second side edge, and wherein the method has the steps of trimming said first length from said extended portion of the head rail and further trimming said fourth length from said extended portion of said bottom rail.

5. The method of claim 4, wherein said trimming of the head rail and said bottom rail take place substantially simultaneously.

6. The method of claim 1, further comprising the steps of placing said extended portion of the head rail through a head rail support opening, and inserting said extended portion of the head rail through a head rail cutting die, and moving said head rail cutting die relative to said head rail support opening to trim the head rail.

7. The method of claim 6, wherein the blind has a bottom rail, and wherein the method further comprises the steps of placing an extended portion of said bottom rail through a bottom rail support opening, and further inserting said extended portion of said bottom rail through a bottom rail cutting die, and moving said bottom rail cutting die relative to said bottom rail support opening to trim said bottom rail.

8. The method of claim 7, further comprising the steps of inserting said first side edge of the fabric panel through a fabric panel support opening and passing said fabric panel in registration with a cutter operating said cutter to trim said first side edge of the fabric panel, moving the head rail and said bottom rail in the opposite direction from said second side edge of the fabric panel, inserting said second side edge of the fabric panel through said fabric panel support opening, passing the fabric panel in registration with said cutter, operating said cutter to trim said second side edge of the fabric panel, and moving the head rail and said bottom rail in the opposite direction from said first side edge of the fabric panel.

9. A method of trimming a blind, comprising:
selecting a first end of a head rail for trimming, said first end being remote from a second end of said head rail, said second end including cord controls of the blind;
sliding a fabric panel with respect to said head rail so that said first end extends away from a first side edge of said fabric panel;
trimming said first end of said head rail by a first length;
sliding said fabric panel with respect said head rail so that said first side edge of said fabric panel extends away from said first end of said head rail;
trimming said first side edge of said fabric panel by a second length, said second length being one half of said first length;
sliding said fabric panel with respect to said head rail so that a second side edge of said fabric panel extends away from said second end of said head rail; and
trimming said second side edge of said fabric panel by said second length.

10. The method of claim 9, further comprising sliding said fabric panel with respect to said head rail so that said first and second side edges of said fabric panel are substantially uniform to said first and second ends of said head rail, respectively.

11. The method of claim 9, wherein trimming said first end of said head rail comprises moving a lever to move a shear plate through a shearing path and wherein trimming said first anti second side edges of said fabric panel comp comprises moving said lever to move a cutting blade through a cutting path.

12. The method of claim 11, wherein said cutting path is longer than said shearing path.

13. The method of claim 12, wherein said cutting path requires less leverage than said shearing path.

14. A method of trimming a blind, comprising:
selecting a first end of a head rail and a bottom rail for trimming, said first end being remote from a second end of said head and bottom rails, said second end including cord controls of the blind;
sliding a fabric panel with respect to said head and bottom rails so that said first end extends away from a first side edge of said fabric panel;
trimming said first end of said head and bottom rails simultaneously by a first length;
sliding said fabric panel with respect to said head and bottom rails so that said first side edge of said fabric panel extends away from said first end;
trimming said first side edge of said fabric panel by a second length, said second length being one half of said first length;
sliding said fabric panel with respect to said head and bottom rails so that a second side edge of said fabric panel extends away from said second end of said head and bottom rails; and
trimming said second side edge of said fabric panel by said second length.

15. The method of claim 14, further comprising sliding said fabric panel with respect to said head and bottom rails so that said first and second side edges of said fabric panel are substantially uniform to said first and second ends of said head and bottom rails, respectively.

* * * * *